May 26, 1964
W. T. RENTSCHLER
3,134,316
PHOTOGRAPHIC CAMERA WITH COUPLED EXPOSURE METER
AND INTERCHANGEABLE LENS ASSEMBLIES
Filed July 22, 1957
2 Sheets-Sheet 1
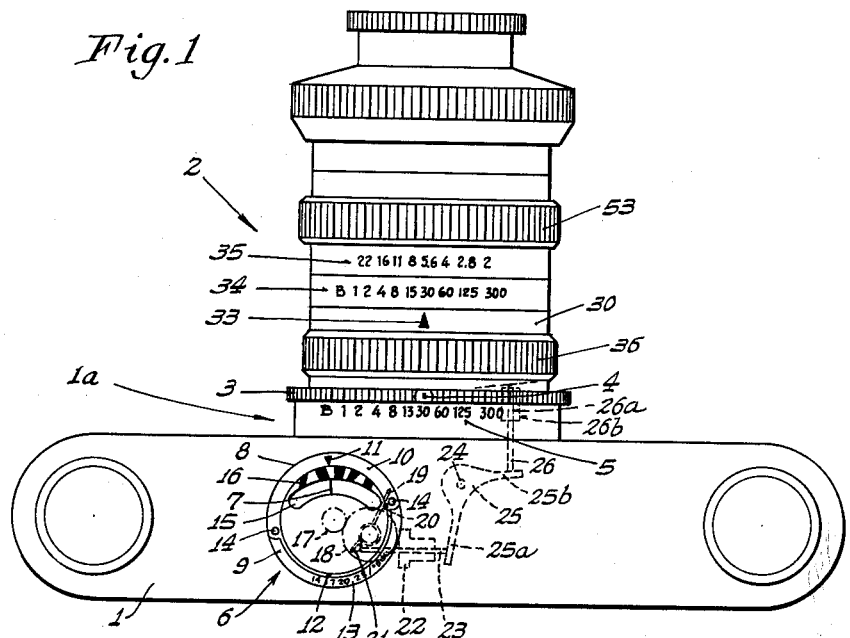
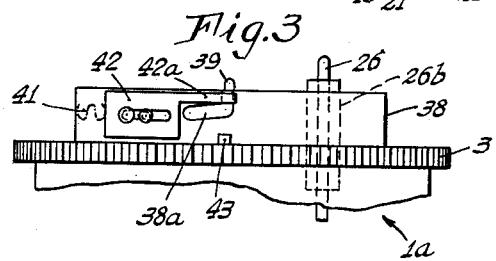
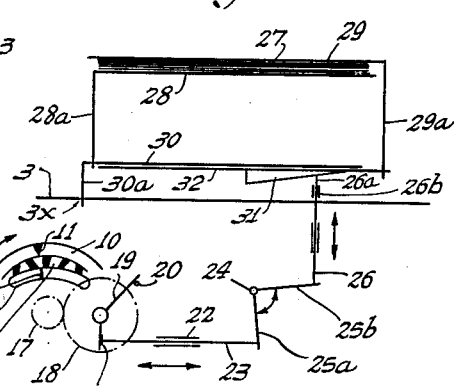
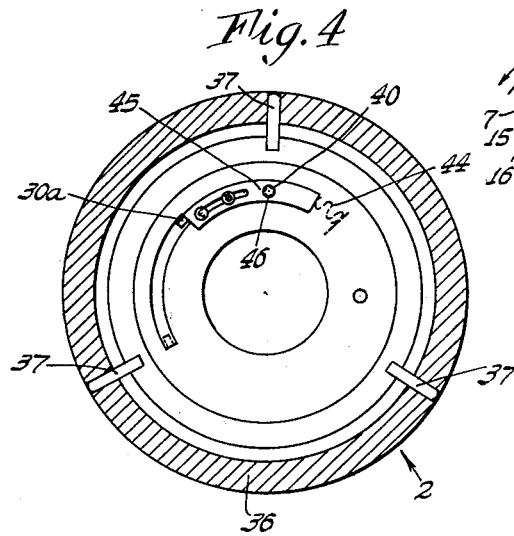
INVENTOR.
Waldemar T. Rentschler
BY
Munn, Liddy, Daniels & March
ATTORNEYS

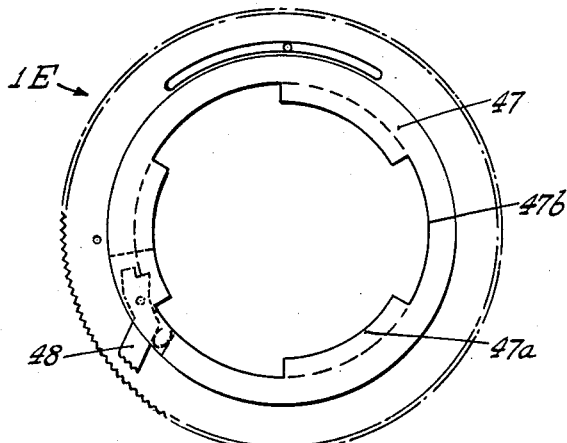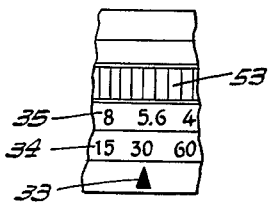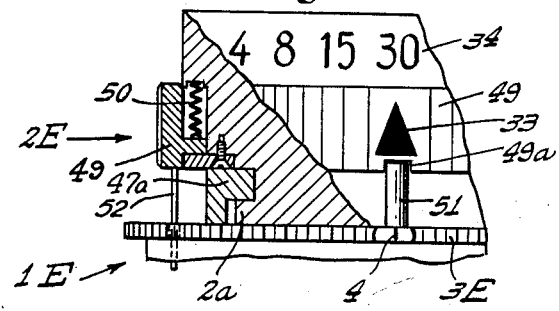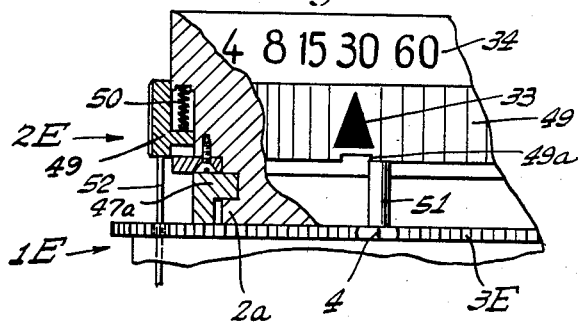
INVENTOR.
Waldemar T. Rentschler
BY
Munn, Liddy, Daniels & March
ATTORNEYS

United States Patent Office 3,134,316
Patented May 26, 1964

3,134,316
PHOTOGRAPHIC CAMERA WITH COUPLED EXPOSURE METER AND INTERCHANGEABLE LENS ASSEMBLIES
Waldemar T. Rentschler, Calmbach (Enz), Germany, assignor to Alfred Gauthier G.m.b.H., Calmbach (Enz), Germany, a corporation of Germany
Filed July 22, 1957, Ser. No. 673,364
Claims priority, application Germany July 24, 1956
11 Claims. (Cl. 95—64)

This invention relates to photographic cameras having coupled exposure meters and interchangeable lens assemblies of the type provided with built-in diaphragm structures.

Various types of photographic cameras of the above class are known and have been proposed in the past. As a general rule, such prior cameras have involved an appreciable additional cost because of the coupling provided between the diaphragm and speed setting members on the one hand and the exposure meter on the other hand, and such additional cost has been appreciably greater than with cameras wherein there is no coupled exposure meter.

The above disadvantage of these prior cameras is obviated by the present invention, and one object of the invention is to provide a novel and improved photographic camera having a coupled exposure meter and having interchangeable lens assemblies provided with diaphragms, wherein a much smaller cost or expense is involved as campared with the above mentioned cameras having coupled exposure meters.

In accomplishing the above object there are provided by the invention interchangeable lens assemblies in each of which the diaphragm blades are associated with a pair of rings disposed to be coaxial with respect to the lens axis and to be turnable thereabout as well as with respect to each other.

The organization is such that when any one lens assembly is mounted on the camera one of the diaphragm rings becomes coupled with a ring on the camera which is also coaxial with respect to the lens axis, said camera ring being connected with the speed-setting mechanism of the shutter. The second diaphragm ring is associated, within the lens assembly itself, with a control device arranged to be coupled to a driving linkage carried by the camera, by which the tracing member of the exposure meter may be actuated.

A feature of the invention resides in the provision of an improved camera structure having coupled speed and diaphragm members as above characterized, wherein but a single controlling member need be provided on the lens assembly, to effect the actuation of the exposure-meter tracing member in coordination with the diaphragm structure, thus obviating the necessity for appreciable additional cost or expenditure to accomplish such function. By this organization in effect a direct-acting connection may be established between one of the diaphragm rings and the tracing member of the exposure meter or a transmission part thereof, in a manner applicable to all different types of cameras of the kind wherein a speed-setting ring is coaxially arranged in the well known manner about the lens axis.

Another feature resides in the provision of novel keying or safety blocking devices which insure correct mounting of the lens assemblies and eliminate the possibility of damage to the coupling components or other interfitting parts.

In the drawings accompanying this specification, similar characters of reference indicate corresponding parts wherever possible in the several views, in which:

FIGURE 1 is a top plan view of a camera embodying the invention, there being shown in schematic represen-
tation the connection between the exposure meter carried by the camera and the control device constituting a part of the interchangeable lens assembly.

FIG. 2 is a schematic representation of the connections between the diaphragm and speed setting mechanisms, and of the coupling between the diaphragm setting mechanism and the exposure meter.

FIG. 3 is a side elevational view of a portion of the camera, showing the lens attaching means and a keying or safety device to insure proper securement of the interchangeable lens assemblies to the camera.

FIG. 4 is a transverse sectional view through a lens assembly, taken at the rear of the lenses and illustrating several cooperable components in conjunction with the safety device of FIG. 3.

FIG. 5 is an end elevational view of a connection or mounting device for attaching an interchangeable lens assembly to the camera, illustrating a modification of the invention.

FIG. 6 is a fragmentary view partly in plan and partly in axial section, showing a releaseable coupling means for connecting the speed and diaphragm structures of a camera and lens assembly, employing the mounting device of FIG. 5. The coupling is shown as not yet effected.

FIG. 7 is a view like FIG. 6, but showing the coupling as having been completed.

FIG. 8 is a fragmentary top plan view of a portion of the lens assembly shown in FIG. 1, illustrating in enlarged form the scales and index mark therefor.

Referring to FIG. 1, the camera housing is indicated at 1, said housing having a shutter structure designated generally by the numeral 1a. Attached to the shutter structure 1a of the camera is an interchangeable lens assembly 2. The shutter structure 1a includes a speed setting ring 3 connected in the well-known manner with the shutter-speed setting mechanism (not drawn).

The speed-setting ring 3 has an index mark 4 cooperable with a fixed speed scale 5 carried by the shutter structure in the well known manner.

It will be understood that the ring 3, for purposes of the present invention, need not be constituted as a setting ring, since the setting of speed may be done at another location on the housing 1. For example, in certain well-known cameras having focal-plane shutters a speed-setting knob projects from the upper side of the camera. However, for the purposes of the present invention it is essential that the ring 3 be connected with the speed-setting mechanism so as to be moved when the said mechanism is being adjusted.

The housing 1 of the camera further carries an exposure meter 6 having an indicator member 7 of the usual type. A tracing member 8 is provided at the exposure meter, including a carrier segment 9 and a ring 10 shiftable with respect to the segment. The ring 10 has two index marks 11 and 12, the first one serving as a reference for the indicator 7 and the second being adapted for cooperation with a film sensibility scale 13 provided on the carrier segment 9. For the purpose of turnably shifting the ring 10 there is provided thereon a pair of manually operable pins 14.

The indicator 7 of the measuring device is movable under a window 15, and there is further provided a channel scale 16 constituting an intermediary between the indicator 7 and the index mark 11.

The carrier segment 9 is rigidly connected to a pinion 17 which meshes with a gear 18 mounted on a fixed axis on the housing 1. The gear 18 is biased counterclockwise by a spring 19, one end of such spring engaging a fixed lug 20 and the other end engaging an abutment lug 21 on the gear 18. The lug 21 is further engaged by one end of an axially shiftable pin 23 carried in a sleeve bearing 22, the other end of said pin being engaged with an arm 25a of a bell crank or angular lever 25 carried on a fixed axis 24. As effected by the spring 19, the other arm 25b of the lever 24 is held in engagement with an axially movable pin means 26 shiftable in a direction parallel to the lens axis, said pin being carried in a sleeve-type guide (not shown structurally for purposes of clarity).

The parts 17, 18, 23, and 25 represent a transmission device for effecting actuation of the tracing member 9, 10 of the exposure meter 6, in response to axial movement of the pin means 26.

As mentioned previously, the interchangeable lens assembly 2 includes a built-in diaphragm constituted of the usual well-known diaphragm blades. In the schematic representation of FIG. 2 the diaphragm blades are indicated at 27.

In accordance with the present invention the diaphragm blades 27 are supported and actuated by two rings which are coaxial with the lens axis and are turnable about the same as well as with respect to each other. When the lens assembly 2 is being mounted on the camera shutter structure 1a one of the said two rings is coupled with the speed-setting ring 3. The second one of the two rings is permanently connected with a control device carried by the lens assembly, which device is adapted to effect actuation of the tracing member 9, 10 of the exposure meter 6 through axial movement imparted to the transmission pin 26.

In FIG. 2 the two diaphragm rings are shown schematically, the first being designated 28 and the second 29.

The actual construction of the rings 28 and 29 may be effected in the manner well known with diaphragm-actuating mechanisms, one ring pivotally carrying the diaphragm blades 27 and the other ring having controlling cams by means of which the blades are shifted during relative turning movement of the two rings. When the rings 28 and 29 are moved in the same direction and by the same amount, no displacement of the diaphragm blades 27 will occur with respect to each other, and accordingly there will be no change in the opening for the light as determined by such blades. A diaphragm setting device wherein the diaphragm segments or blades are arranged on two rings which are positioned coaxially with respect to the axis of the camera, and which are rotatable about the axis in the same and also opposite directions is well-known in the art; see for example United States Patent No. 2,580,324, issued to Schwarz and dated December 25, 1951.

As seen in FIG. 2 a releasable coupling means is provided between the rings 28 and 3, said coupling means including an arm 28a extending rearwardly from the ring 28, and also including a ring 30 coaxial on the lens assembly and rotatable with respect thereto, receiving the extremity of the arm 28a to be driven thereby. The ring 30 has an arm 30a which acts as an abutting portion, extends rearwardly of the lens assembly, and constitutes one of the separable coupling parts, said arm being receivable in a suitable recess 3x in the ring 30 and drivingly engaging an edge of said recess, said edge constituting a cooperable abutting portion of the ring 30.

Also, as shown in FIG. 2, the interchangeable lens assembly 2 has a control device in the form of a driven ring 32 coaxial therewith and turnable with respect thereto, the rings 29 and 32 being coupled for simultaneous turning movement by an arm 29a on the ring 29. On the driven ring 32 I provide a controlling cam 31 adapted to act in a direction axially of the lens assembly 2, said cam being disposed at the rear of said assembly. It will now be seen that the cam 31 may effect actuation of the tracing member 9, 10 of the exposure device 6, by virtue of the transmission 17, 18, 23, 25 and 26.

In the illustrated embodiment of the invention the ring 30, constituting an intermediary between the rings 28 and 3, is adapted to also constitute an indicator, being provided with an index mark 33 as shown in FIG. 1. The mark 33 is cooperable with a speed scale 34 fixedly carried by the lens assembly 2, and with a diaphragm scale 35 connected with the diaphragm ring 29. The scales 34 and 35 are advantageously arranged as shown in FIG. 1, the speed scale 34 being disposed to the rear of the diaphragm scale 35, and the latter being preferably carried by a manually operable ring 53 connected to the diaphragm ring 29. The index mark 33 is disposed to the rear of the scales 34 and 35, thereby to enable the best possible survey to be had of the paired values on the scales as effected by the speed-diaphragm setting.

As shown in FIG. 1, the speed setting is indicated by two scales, viz. the scale 5 on the shutter structure 1a and the scale 34 on the lens assembly 2. This provides the advantage that not only can the paired values on the scales 34 and 35 be readily seen, but also the speed setting of the shutter may be known at all times, even though the interchangeable lens assembly 2 is removed from the camera housing 1.

By the provision of the intermediary ring 30 located between the rings 3 and 28 it is possible to obtain a short and sturdy separable coupling between the separable rings 3 and 30 which is independent of the front-to-rear position of the diaphragm ring 28. Thus, the provision of the additional ring 30 provides an advantageous mechanical structure, as well as enabling a quick and easy survey to be had of the paired speed-diaphragm values of the scales 34, 35.

Referring again to FIG. 2, it will be noted that, by the provision of the controlling cam 31 which acts in an axial direction to effect a coupling between the diaphragm ring 29 and the exposure meter tracing member 9, 10 there is made possible a small diameter of the lens assembly 2, since no additional space is required in a radial direction by such control device.

In addition, the provision of the controlling cam 31 makes it posisble to effect a reliable transmission by the use of axially shiftable cam follower in the nature of a pin means movable in a direction parallel to the lens axis. Thus, in the shutter structure and camera as well as in the lens assembly the smallest possible space is needed for the transmission device between the diaphragm ring 29 and the exposure meter 6.

The said cam follower, i.e. pin means may have one or several parts shiftable parallel to the lens assembly. For example, a transmission pin including a first part 26a may be provided on the lens assembly, carried in a bushing 26b, said pin part 26a being aligned with and abutting a second transmission pin part 26 of the camera shutter structure. With such organization, the cam 31 need not be located at the rear of the lens assembly 2, but instead may be shifted forwardly or located in any desired axial position, and still function to effect the desired control at the exposure meter 6.

It will be understood from a consideration of FIG. 1 that the pin parts 26 and 26a may be constituted as a single transmission and cam-follower pin, supported wholly by the shutter structure 1a, and with such organization the cam 31 is preferably carried by the ring 32 at the rear of the lens assembly 2. This arrangement has the advantage that the axial location of the second diaphragm ring 29 will not adversely affect the accuracy and efficiency of the transmission as constituted by the cam 31, pin 26, etc. Thus, the bearing requirements of the second diaphragm ring 29 may be governed exclusively by the requirements of the diaphragm blades 27, whereas the cam-carrying ring 32 may have a bearing provided with close axial tolerances, as required to effect high accuracy in the functioning of the cam 31.

As accomplished by the present invention, the attaching or mounting of the lens assembly 2 on the shutter structure does not require any greater attention or skill than that needed for attaching a lens assembly to a camera which does not have a coupled exposure meter. It is understood that where no exposure meter is present, the main consideration would be only to effect a proper and suitable coupling between the first diaphragm ring 28 and the speed setting ring 3.

In order to attain the above objective of the invention, so that the attaching of the lens assembly may be done in the simplest possible manner I provide novel safety locking or blocking devices which prevent the attaching of the lens assembly unless the diaphragm and speed-setting devices are first correctly positioned. Such correct setting positions may be preferably those wherein the diaphragm aperture has its smallest value and the speed-setting mechanism has its greatest speed. Or, conversely the said settings may be those for the largest diaphragm apertures and the slowest speed. When the said settings or positions are effected, then the separable interfitting parts of the coupling device associated with the rings 28 and 3 will be properly aligned, with respect to the lens positioning or keying means, for effecting the proper attaching of the lens assembly to the shutter structure 1a. For example, when applying a lens assembly to the shutter structure 1a a positioning or keying pin on such structure may be received in a notch or bore of the lens assembly to orient the latter, and such act will automatically correctly position the separable coupling parts for proper engagement.

It will be understood that such organization is operative where the lens assembly, in being fitted to the shutter structure, does not involve any turning movement with respect to the latter, but instead is clamped thereto by a usual type of clamping device, as for example a threaded nut or a bayonet lock nut.

Where the attaching of the lens assembly to the shutter structure does involve relative turning movement, there is still possible a simple and effective separable coupling between the rings 3 and 28, as will be hereinafter disclosed.

FIGS. 3 and 4 show embodiments of the invention wherein safety locking or blocking devices are provided which are adaptable for lens assemblies which do not require a physical turning of the lens assembly per se in being secured to the shutter structure. In FIG. 3 there is shown a blocking device carried by the shutter structure or camera, and FIG. 4 illustrates a second or complementary blocking device which is carried by the lens assembly.

Where turning movement of the lens assembly per se accompanies the attaching of the lens assembly to the shutter structure 1a, as in the case of a bayonet pin and slot fastening device, the embodiments of the invention illustrated in FIGS. 5–7 are applicable.

Considering first FIGS. 1, 3, and 4, the lens assembly 2 is shown as having a turnable, bayonet-lock type of fastening nut or ring 36, constituting part of a clamping union which has inwardly extending radial pins 37. On the shutter structure 1a there is provided a ring-shaped fastening portion or member 38 having angular or bayonet recesses 38a adapted to receive the pins 37. A further positioning or keying means is provided, in the form of a keying pin 39 on the shutter structure 1a and a cooperable bore 40 disposed on the interchangeable lens assembly 2. When attaching the lens assembly to the shutter structure, the pin 39 on the fastening portion 38 is made to enter the bore 40, thereby to properly orient the lens assembly on the camera. Then the nut 36 is turned until the pins 37 thereof are aligned with the open or mouth portions of the recesses 38a. With the pins 37 of nut 36 aligned with the mouth of recesses 38a, the lens assembly is pushed axially toward the camera housing part 38 to position pins 37 into recesses 38a. By now further turning the fastening nut 36 in the proper direction, clockwise as viewed from the front of the lens assembly 2, the latter will be securely clamped to the shutter structure 1a.

A safety or blocking device is provided, to insure proper positioning of the cooperable coupling parts, such blocking device comprising also a safety lock, and including a locking member 42 slidably mounted on the lens mounting portion 38 of the shutter structure 1a, as seen in FIG. 3. The member 42 comprises a slide arranged to be shifted so as to close the bayonet slot 38a under the action of a spring 41. As clearly shown, a finger 42a of the slide extends across the mouth portion of the recess 38a to prevent ingress or egress of a pin 37. The slide 42 may be automatically shifted against the action of the spring 41 from its blocking position by a pin 43 (FIG. 3) fixedly carried by the speed setting ring 3, such shifting occurring only when the ring 3 has been moved to the proper setting, as for example either the fastest speed or the slowest speed. Such positioning of the setting ring 3 will open the mouth of the bayonet slot 38a and simultaneously properly position a separable coupling part, namely the recessed portion 3x in the ring 3 (FIG. 2) for reception of the arm 30a. I further provide means on the lens assembly 2 for effecting proper positioning of the said arm 30a to make possible the attachment of the lens assembly 2 to the shutter structure 1a.

In accomplishing this, I provide a blocking means in conjunction with the pin 39 and recess 40, such blocking means being shifted out of the way when the diaphragm-setting mechanism is positioned in its proper setting.

As is apparent from FIG. 4, the locking slide 45, which is shiftably mounted on the interchangeable lens assembly, is biased by the spring 44 which tends to hold it in an extreme left position, that is, a position shifted to the left from the position it occupies in FIG. 4. In this left position the slide 45 covers a bore 40 provided in the interchangeable lens assembly for reception of a keying pin 39 mounted on the camera, and thereby prevents the bore 40 from receiving the pin 39 as required for fastening the interchangeable lens on the camera.

In the position shifted to the right as shown, an aperture 46 of the slide 45 is aligned with the bore 40 so that the pin 39 may be received through the aperture into the bore.

The uncovering of the bore 40 by the slide 45 is effected by moving the slide in response to the motion of the intermediary ring 30 to its initial position correlated with one of the end (extreme) positions of the diaphragm. This motion correspondingly influences the slide 45 by means of the coupling arm 30a mounted on the ring 30; during the motion of the ring into said initial position, the coupling arm 30a drives the slide 45 and moves the same into the position shown in FIG. 4 against the action of the spring 44. In this position, which corresponds to the initial position of the intermediary ring 30, the aperture 46 provided on the slide aligns with the bore 40 of the interchangeable lens assembly, so that there is now no longer any obstruction to the keying pin 39, and the latter may enter the bore 40 as required for fastening the interchangeable lens assembly on the camera.

In a simple and economical way I accomplish this, referring to FIG. 4, by the provision of a slide 45 acted on by a spring 44, said slide blocking the recess 40 whenever the diaphragm mechanism is not in the proper position for coupling. When the diaphragm mechanism is shifted to its proper setting, the bore 40 will be uncovered, for the reception of the keying pin 39. Automatic actuation of the slide 45 is effected by the arm 30a carried by the ring 30. The arm 30a, as previously explained, constitutes one of the separable coupling parts between the rings 3 and 30.

When the slides 45 and 42 are properly positioned in their unlocking settings, in response to proper setting of the diaphragm ring 28 and speed setting ring 3, the lens assembly 2 may be fastened to the shutter structure 1a by insertion of the pin 39 in the recess 40, and insertion of all three bayonet pins 37 in the bayonet slots 38a. The coupling arm 30a will now correctly enter the recess 3x in the ring 3 without interference or impediment.

Another structure by which proper mounting of the lens assembly 2 on the shutter structure 1a is effected, is illustrated in FIGS. 5–7, this being intended for use where the interchangeable lens assembly is secured to the shutter structure by a bayonet lock. As shown, the shutter structure 1E has a fastening portion 47 provided with three equi-spaced lugs 47a extended inward toward the shutter axis and forming between them notches or recesses 47b, and the rear of the lens assembly 2E has a central thimble provided with three lugs 2a directed outward. When the lens assembly 2E is fastened to the shutter structure 1E the lugs 2a are intended to enter the recesses 47b of the plate 47. By turning the lens assembly 2E the lugs 2a will then be disposed in back of the lugs 47a as shown in FIGS. 6 and 7, thereby securing the assembly to the camera. This is readily evident from an inspection of FIGS. 6 and 7. For securing the lens assembly 2E against unintentional release there is provided a usual type of spring-charged, clockwise biased locking lever 48, FIG. 5, pivotally mounted on the plate 47 cooperating with a corresponding nose or shoulder of the lens assembly (not shown). One arm of the lever 48 is formed as a knurled accessible finger piece while the other arm has a notched latching end (shown in broken outline) for engaging a portion of the lens assembly to latch the latter against counterclockwise turning as viewed from the front.

To effect the proper connection between the rings 3E and 28 (not shown) in this form of the invention, there is provided on the lens assembly 2E a ring 49 which is connected with a first diaphragm ring 28 (not shown) and which is shiftable axially against a spring action. The ring 49 may have the setting mark 33, and may thus correspond to the ring 30 described above in connection with the embodiment of the invention previously illustrated. A spring 50 engages the ring 49 and normally holds the latter in a rearward position, that is, towards the shutter structure 1E. The ring 49 is connected to a diaphragm ring 28 (not shown) for turning simultaneously therewith, in any suitable manner, as for example in a way similar to that by which the ring 30 is connected to the diaphragm ring 28 as shown in FIG. 2, as by providing a longitudinal groove (not shown) in the inner circumference of the ring 49 for engagement with the arm 28a (see FIG. 2) of the ring 28.

To effect a separable connection between the ring 49 and the ring 3E the latter is provided with a pin 51 adapted to be received in a slot 49a of the ring 49. For the purpose of attaching the lens assembly 2E to the shutter structure 1E and activating the bayonet lock, the ring 49 is merely brought into engagement with the pin 51, the ring retracting slightly and compressing the spring 50. Then either the ring 3 or the ring 49 is turned until the pin 51 becomes fitted in the notch 49a. Thus there is effected the driving connection between the rings 3 and 28.

For the purposes of preventing a wrong setting or misexposure which might result if the driving connection 49a, 51 is not effected, there is further provided by the invention a locking or warning device which may be rendered inoperative by the ring 49 when the lens assembly 2e is properly fastened to the shutter structure 1E. Such locking device may bolt in any suitable manner (not shown) the camera or shutter release mechanism, or it may provide an indication or warning in the view finder of the camera. Such locking or warning devices for bolting the shutter or camera release, as well as for providing an indication in the view finder are well known as such, and accordingly details thereof are not set forth herein.

In the embodiment of the invention illustrated in FIGS. 5–7 a connection to such well known device may be effected through the pin 52 carried by the shutter structure.

The operation and manner of setting the camera of the present invention as above described, are as follows:

(1) *Preliminary operations for attaching the lens assembly to the shutter structure.*—Considering the embodiment of the invention shown in FIGS. 3 and 4, the setting mechanisms for speed and diaphragm of the shutter and lens assembly are brought to the proper positions to render inoperative the blocking devices above explained. In the embodiment of the FIGS. 5–7, no preparatory work is necessary, in this respect.

(2) *Fastening the lens assembly to the shutter structure.*—This is done in the same manner as described above in detail. With the embodiment of the invention shown in FIGS. 3 and 4 the coupling between the rings 30 and 3 takes place automatically when the lens assembly is brought against the shutter structure, and the interfitting parts are secured in place by actuation of the fastening nut 36. With the embodiment of FIGS. 5–7, the driving connection between the pin 51 and notch 49a is accomplished by turning one of the rings 3E or 49 after the lens assembly has been brought against the shutter structure.

(3) *Setting the diaphragm and speed members as indicated by the exposure device.*—Provided that the sensibility of the film has already been adjusted at the scale 13, the second diaphragm ring 29 is adjusted by turning the actuation ring 53 connected to it (FIG. 1) until the mark 11 is opposite the pointer 7. Depending on the previous setting, this may require turning of only the ring 29 or it may require turning of the speed setting ring 3, too, by means of the diaphragm ring 28. This latter, of course, will also adjust the speed setting of the camera, and for obtaining the proper speed setting related to the diaphragm setting, the rings 3 and 53 are preferably utilized in conjunction with a notched detent device well known in the art. After effecting coincidence of the mark 11 and pointer 7, the speed-diaphragm pair or combination is adjusted by turning the speed-setting ring 3. This completes the adjustment of the diaphragm and speed for the camera.

It will now be understood that there has been provided by this invention a novel and simplified coupling means between the diaphragm and speed-setting members, and the diaphragm and exposure meter in a photographic camera of the type having interchangeable lens assemblies. Such novel coupling means is not limited to cameras of special structure, but may be applied to all types of cameras employing interchangeable lenses. This has been accomplished by mounting the control device for the exposure meter on the interchangeable lens structure instead of on the camera, thus obviating any special requirements of the camera as to its structure, shutter, etc. The invention also has utility in connection with cameras of the interchangeable lens type even though these have no coupled exposure meters. In such case, the simplicity and reliability of the present improved coupling device is also manifested. With a camera of this type the second diaphragm ring 29, besides its connection with a diaphragm scale, is also coupled to an exposure-value scale which cooperates with an index mark fixedly mounted on the lens assembly.

Variations and modifications may be made within the scope of the claims, and portions of the improvements may be used without others.

I claim:

1. In a photographic camera combination of a shutter structure having a speed setting mechanism including a speed setting ring coaxially disposed with respect to a lens axis, and an exposure meter having a tracing member; the improvement of an interchangeable lens assembly having a built-in diaphragm mechanism and a co-operating readily detachable coupling means for operatively connecting and disconnecting said diaphragm mechanism of said interchangeable lens with both said speed setting ring and with said tracing member of said exposure meter whereby said lens assembly can be readily and physically detached and separated from said speed setting ring and exposure meter means; said diaphragm assembly including a pair of coaxially disposed and relatively movable diaphragm adjusting rings, and a set of diaphragm blades interconnected with said pair of adjusting rings whereby relative adjustment of said blades is effected by relative movement of said diaphragm rings; said coupling means including relatively movable camera ring and driving control ring, said camera ring and driving control ring being coaxially disposed between said diaphragm adjusting rings and said speed setting ring, means operatively connecting one of said diaphragm adjusting rings with said camera ring, and a readily detachable connector for operatively connecting and disconnecting said camera ring of said lens assembly to said setting ring, means connecting the other diaphragm adjusting ring to said driving control ring, and means for operatively connecting and disconnecting said driving control ring of the lens assembly to the tracing means of said exposure meter, said latter means including a camming means connected to said control driving ring, a cam follower engageable in camming relationship with said camming means when said lens assembly is attached, and a transmission means interconnecting said cam follower with said tracing means whereby rotation of said driving control ring results in the camming of said follower to effect displacement of said transmission means and operation of said tracing member; and readily releasable means for attaching the interchangeable lens assembly to said shutter structure for maintaining said detachable connector and camming means operatively associated with both said speed setting ring and cam follower of said exposure meter respectively.

2. The invention as defined in claim 1 in which the camming means acts in an axial direction, and in which the cam follower comprises an elongate pin means engageable with the camming means and shiftable in a direction parallel to the lens axis.

3. The invention as defined in claim 2 in which the pin means includes a first and a second aligned pin part, said second pin part being movable with the first mentioned pin part, said first pin part being carried by the interchangeable lens assembly, said second pin engaging the camming means and constituting the cam follower therefor.

4. The invention as defined in claim 1 in which said releasable means for detachably connecting the lens assembly to the shutter structure includes two interfitting connections provided between the shutter structure and the lens assembly, each interfitting connection comprising first and second coengageable members on said assembly and structure respectively, and in which there are two blocking means each preventing interfitting engagement of separate pairs of the said first and second members except for predetermined positions of the said speed setting mechanism and the said one ring of the said pair.

5. The invention as defined in claim 4 in which one of said blocking means is mounted on the shutter structure and comprises a member movable between nonblocking and blocking positions in response to movement of the said speed-setting mechanism.

6. The invention as defined in claim 5 in which one of the blocking means comprises spring-biased slides carried respectively by the shutter structure and lens assembly.

7. The invention as defined in claim 4 in which one of the blocking means is carried by the interchangeable lens assembly and comprises a member shiftable between blocking and non-blocking positions and actuated in response to movement of the said one ring of the pair.

8. The invention as defined in claim 4 in which there is spring means carried by the lens assembly, normally tending to hold the diaphragm mechanism in a predetermined end position.

9. The invention as defined in claim 1 in which the releaseable means includes a coupling ring 49 turnably mounted on the lens assembly and connected with the said one ring 28 of the pair, said coupling ring 49 being axially shiftable and spring biased in an axial direction, and in which there is a single pair of interfitting parts having cooperable abutting portions 49a, 51 secured respectively to the said one ring of the pair and to the said coupling ring.

10. The invention as defined in claim 9 in which the coupling ring has means movable parallel to the axis of the lens assembly and adapted for engagement with a camera release lock, to control the latter.

11. The invention as defined in claim 1 in which the releaseable means comprises a camera ring rotatably mounted on the lens assembly, having an index mark referrable to a scale.

References Cited in the file of this patent

UNITED STATES PATENTS

| | | |
|---|---|---|
| 2,053,089 | Kuppenbender | Sept. 1, 1936 |
| 2,596,328 | Dorsey | May 13, 1952 |
| 2,612,091 | Weiss | Sept. 30, 1952 |
| 2,889,761 | Gebele | June 9, 1959 |

FOREIGN PATENTS

| | | |
|---|---|---|
| 756,282 | Germany | Feb. 23, 1953 |